(12) United States Patent
Hamad et al.

(10) Patent No.: US 9,751,969 B2
(45) Date of Patent: Sep. 5, 2017

(54) NCC-BASED SUPRAMOLECULAR MATERIALS FOR THERMOPLASTIC AND THERMOSET POLYMER COMPOSITES

(75) Inventors: Wadood Y. Hamad, Vancouver (CA); Shunxing Su, Richmond (CA)

(73) Assignee: CELLUFORCE INC., Montreal, QC (CA)

( * ) Notice: Subject to any disclaimer, the term of this patent is extended or adjusted under 35 U.S.C. 154(b) by 511 days.

(21) Appl. No.: 14/344,797

(22) PCT Filed: Sep. 12, 2012

(86) PCT No.: PCT/CA2012/000824
§ 371 (c)(1),
(2), (4) Date: Jun. 10, 2014

(87) PCT Pub. No.: WO2013/037041
PCT Pub. Date: Mar. 21, 2013

(65) Prior Publication Data
US 2014/0350188 A1 Nov. 27, 2014

Related U.S. Application Data

(60) Provisional application No. 61/533,891, filed on Sep. 13, 2011.

(51) Int. Cl.
| | | |
|---|---|---|
| C08F 251/02 | (2006.01) |
| C08L 51/02 | (2006.01) |
| C08L 1/02 | (2006.01) |
| C08L 33/08 | (2006.01) |
| C08L 33/10 | (2006.01) |
| C08L 23/06 | (2006.01) |

(52) U.S. Cl.
CPC ............ *C08F 251/02* (2013.01); *C08L 23/06* (2013.01); *C08L 51/02* (2013.01); *C08L 1/02* (2013.01); *C08L 2207/04* (2013.01); *C08L 2207/062* (2013.01)

(58) Field of Classification Search
CPC .......... C08F 251/02; C08L 51/02; C08L 1/02; C08L 33/08; C08L 33/10
See application file for complete search history.

(56) References Cited

U.S. PATENT DOCUMENTS

| | | |
|---|---|---|
| 6,444,742 B1 | 9/2002 | Rong et al. |
| 6,465,543 B1 | 10/2002 | Alexandre et al. |
| 6,649,713 B2 | 11/2003 | Tang et al. |
| 6,753,373 B2 | 6/2004 | Winowiecki et al. |
| 6,872,791 B1 | 3/2005 | Lee et al. |
| 6,979,718 B2 | 12/2005 | Klendworth et al. |
| 7,084,199 B1 | 8/2006 | Chou et al. |
| 7,241,829 B2 | 7/2007 | Chung et al. |
| 7,432,319 B2 | 10/2008 | Lu et al. |
| 7,652,084 B2 | 1/2010 | Chu et al. |
| 7,737,211 B2 | 6/2010 | Ottaviani et al. |
| 7,776,943 B2 | 8/2010 | Scott et al. |
| 2010/0148118 A1* | 6/2010 | Beck ..................... C08J 5/18 252/182.12 |
| 2013/0011385 A1* | 1/2013 | Li ......................... C08F 2/00 424/130.1 |

FOREIGN PATENT DOCUMENTS

| | | |
|---|---|---|
| GB | 1501239 | 2/1978 |
| WO | WO 2011/079380 A1 * | 7/2011 |
| WO | WO2011/088562 | 7/2011 |
| WO | WO 2011/100818 | 8/2011 |

OTHER PUBLICATIONS https://web.archive.org/web/20110401112547/http://en.wikipedia.org/wiki/Surfactant; Apr. 2011.*
Araki, Jun et al. "Steric Stabilization of a Cellulose Microcrystal Suspension by Poly(ethylene glycol) Grafting". Langmuir. vol. 17, No. 1. 2001. pp. 21-27.
Carastan, D.J. et al. "Polystyrene/Clay Nanocomposites". International Materials Reviews. vol. 52, No. 6. 2007. pp. 345-380.
De Menezes, Aparecido Junior et al. "Extrusion and Characterization of Functionalized Cellulose Whiskers Reinforced Polyethylene Nanocomposites". Polymer, 50. 2009. pp. 4552-4563.
Lima, M.M.D. et al. "Rodlike Cellulose Microcrystals: Structure, Properties, and Applications". Macromolecular Rapid Communications, 25. 2004. pp. 771-787.
Habibi, Youssef et al. "Highly Filled Bionanocomposites from Functionalized Polysaccharide Nanocrystals". Biomacromolecules, 9. 2008. pp. 1974-1980.
Hasegawa, Naoki et al. "Preparation and Mechanical Properties of Propylene-Clay Hybrids Using a Maleic Anhydride-Modified Propylene Oligomer". Journal of Applied Polymer Science. vol. 67. 1998. pp. 87-92.
Jeon, H.G. et al. "Morphology of Polymer/Silicate Nanocomposites". Polymer Bulletin, 41. 1998. pp. 107-113.
Kato, M. et al. "Preparation and Properties of Polyethylene-Clay Hybrids". Polymer Engineering and Science. vol. 43, No. 6. Jun. 2003. pp. 1312-1316.

(Continued)

*Primary Examiner* — Roberto Rabago
(74) *Attorney, Agent, or Firm* — Buchanan Ingersoll & Rooney P.C.

(57) ABSTRACT

Nanocrystalline cellulose (NCC)-based supramolecular materials, a method for their preparation and their use in thermoplastic and thermoset polymer composites are disclosed. Supramolecular materials of NCC and one or two polymers are synthesized by in situ surface graft copohmerization in a multitude of solvent systems, including water. The nano-scale size supramolecular materials are engineered to have a unique combination of lower polarity and high hydrophobicity and function as copohmers for demanding pohmeric systems such as, but not limited to, polyolefins and polyesters. Nanocomposite materials of enhanced functionality and mechanical properties are produced by compounding the NCC-based supramolecular materials with polymer matrices. The supramolecular materials are used in composite development for packaging materials, structural composites for automotive and construction, as sandwiched foam composites or, combined with biocompatible polymers, in medical applications.

10 Claims, 12 Drawing Sheets

(56) References Cited

OTHER PUBLICATIONS

Littunen, K. et al. "Free radical graft copolymerization of nanofibrillated cellulose with acrylic monomers". Carbohydrate Polymers. vol. 84. No. 3. 2011. pp. 1039-1047.

Ljungberg, N. et al. "New Nanocomposite Materials Reinforced with Cellulose Whiskers in Atactic Polypropylene: Effect of Surface and Dispersion Characteristics". Biomacromolecules, 6. 2005. pp. 2732-2739.

Ljungberg, N. et al. "Nanocomposites of Isotactic Polypropylene Reinforced with Rod-like Cellulose Whiskers". Polymer, 47. 2006. pp. 6285-6292.

Minkova, L. et al. "Thermal Properties and Microhardness of HDPE/Clay Nanocomposites Compatibilized by Different Functionalized Polyethylenes". Polymer Testing, 28. 2009. pp. 528-533.

Okada, Akane et al. "Twenty Years of Polymer-Clay Nanocomposites". Macromolecular Materials and Engineering, 291. 2006. pp. 1449-1476.

Roy, D. et al. "Cellulose Modification by Polymer Grafting: A Review". Chemical Society Reviews. vol. 38. 2009. pp. 2046-2064.

Samir, My Ahmed Said Azizi "Review of Recent Research into Cellulose Whiskers, Their Properties and Their Application in Nanocomposite Field". Biomacromolecules, 6. 2005. pp. 612-626.

Tjong, S.C. "Structural and Mechanical Properties of Polymer Nanocomposites". Materials Science and Engineering. R 53. 2006. pp. 73-197.

Wang, Ki Hyun et al. "Synthesis and Characterization of Maleated Polyethylene/clay Nanocomposites". Polymer, 42. 2001. pp. 9819-9826.

Winey, Karen I. et al. "Polymer Nanocomposties". MRS Bulletin. vol. 32. 2007. pp. 314-322.

Yi, J. et al. "Chiral-nemtaic self-ordering of rodlike cellulose nanocrystals grafted with poly(styrene) in both thermotropic and lyotropic states". Polymer. vol. 49. 2008. pp. 4406-4412.

International Search Report and Written Opinion from related PCT Application PCT/CA2012/000824, dated Jan. 2, 2012, 14 pages.

Supplementary European Search Report from related application No. 12831845.8, dated Apr. 16, 2015, 4 pages.

Rodriguez, et al., "Sisal cellulose whiskers reinforced polyvinyl acetate nanocomposites", Cellulose, vol. 13, Issue 3, 2006, pp. 261-270.

\* cited by examiner

NCC-BASED SUPRAMOLECULAR MATERIALS FOR THERMOPLASTIC AND THERMOSET POLYMER COMPOSITES

CROSS-REFERENCE TO RELATED APPLICATIONS

This application is a national phase application under 35 U.S.C. §371 of International Application No. PCT/CA2012/000824 filed 12 Sep. 2012, which claims priority to U.S. Provisional Application No. 61/533,891 filed 13 Sep. 13, 2011. The entire contents of each of the above-referenced disclosures is specifically incorporated by reference herein without disclaimer.

FIELD OF THE DISCLOSURE

The present disclosure relates to NCC-based supramolecular materials, method for preparing same and use in thermoplastic and thermoset polymer composites thereof.

BACKGROUND OF THE DISCLOSURE

Polymer nanocomposites are composite materials containing at least one phase that has nano-scale dimensions (Winey, K. I. et al. *MRS Bulletin* 2007, 32, 314-322). Compared to microcomposites, nanocomposites have much lower volume additions of the nanoparticles, which facilitate processing and result in lighter products. In order to achieve significant improvements in properties of the composite (such as the mechanical properties, barrier properties, thermal stability, flame retardancy or chemical resistance of polymer nanocomposites), the nanoparticles have to be compatible with the polymer matrices and dispersed well in the polymer matrices to ideally produce exfoliated structures.

Nanocrystalline cellulose (NCC), a chiral nematic structure of high strength and elastic modulus, is renewable and possesses a relatively large reactive surface. The major obstacles to NCC application in composite manufacture are: (1) aggregation of NCC particles, (2) poor dispersion of the hydrophilic NCC particles in mostly hydrophobic polymer matrices, and (3) poor interfacial adhesion between NCC and polymer. Different approaches have been followed to increase NCC's dispersion and interaction with polymer matrices. NCC has been either coated with surfactant or chemically surface modified (see Samir, M. et al. Biomacromolecules, 2005, 6 (2), 612-626 and Lima, M. M. D. et al. Macromolecular Rapid Communications, 2004, 25 (7), 771-787). Use of surfactants is a simple enough method, but a large amount of surfactant is normally required which would negatively impact the strength of the resulting composite. Surface modification, on the other hand, generally involves reaction with the hydroxyl groups on the NCC surface. Silanes have, for example, been employed to graft hydrophobic groups onto the NCC surface. Moreover, polymers with hydroxyl reactive groups have been used as well, such as polyethylene glycol (PEG) (see Araki, J. et al. Langmuir, 2001, 17 (1), 21-27, Polycaprolactone (PCL) (see Habibi, Y. et al. Biomacromolecules, 2008, 9 (7), 1974-1980) and poly(propylene) (PP) (see Ljungberg, N. et al. Biomacromolecules 2005, 6 (5), 2732-2739). Such modifications can make NCC more hydrophobic and give NCC reasonable stability in organic solvents. However, these reactions (i) generally involve several, intricate steps, (ii) are therefore costly, and (iii) have limited scalability.

SUMMARY OF THE DISCLOSURE

In one aspect, there is provided a process for preparing NCC-based supramolecular material comprising:
(i) providing a mixture of NCC, Na-NCC or a surfactant-modified-NCC and one or more monomers, said mixture being suitable for free radical polymerization;
(ii) providing a free radical initiator or a solution thereof;
(iii) purging oxygen from the mixture of (i) and the solution of (ii);
(iv) mixing (i) and (ii) after step (iii) to allow polymerization; and
(v) isolating said NCC-based supramolecular material.

In a further aspect, there is provided a NCC-based supramolecular material comprising hydrophobic polymer(s) grafted onto the NCC surface.

In a further aspect, there is provided a NCC-based supramolecular material prepared in accordance with the process as defined herein.

In still a further aspect, there is provided nanocomposite comprising a NCC-based supramolecular material and one or more hydrophobic polymer.

In a further aspect, there is provided a process for preparing a nanocomposite comprising:
a) compounding a NCC-based supramolecular material and one or more processible polymer to be used for composite; and
b) processing the mixture obtained from a) to obtain said nanocomposite.

In one aspect, there is provided an article prepared from the NCC-based supramolecular material as defined herein.

In still a further aspect, there is provided an article prepared from the nanocomposite as defined herein.

DETAILED DESCRIPTION OF THE EMBODIMENTS

In one embodiment, the process is comprising:
(i) providing a mixture of NCC or Na-NCC and one or more monomers, and optionally adjusting the pH of said mixture to be suitable for free radical polymerization;
(ii) providing a solution of a free radical initiator;
(iii) purging both (i) and (ii) above using an inert gas;
(iv) mixing (i) and (ii) resulting from step (iii) to allow polymerization; and
(v) isolating said NCC-based supramolecular material.

In one embodiment, the process is comprising:
(i) providing a mixture of NCC and two or more monomers in an aqueous medium, wherein at least one monomer has water solubility; and optionally adjusting the pH of said mixture to be suitable for free radical polymerization;
(ii) providing a solution of a free radical initiator;
(iii) purging both (i) and (ii) above to remove oxygen (e.g. using an inert gas);
(iv) mixing (i) and (ii) resulting from step (iii) to allow polymerization; and
(v) isolating said NCC-based supramolecular material.

In one embodiment, the process is comprising:
(i) providing a mixture of Na-NCC and one or more water-insoluble monomer(s) in an organic solvent;
(ii) providing a solution of a free radical initiator in an organic solvent;
(iii) purging both (i) and (ii) above to remove oxygen (e.g. using an inert gas);
(iv) mixing (i) and (ii) resulting from step (iii) to allow polymerization; and
(v) isolating said NCC-based supramolecular material.

In one embodiment, the process is comprising:
(i) providing a mixture of a surfactant-modified-NCC and one or more water-insoluble monomer(s) in an organic solvent;
(ii) providing a solution of a free radical initiator in an organic solvent;
(iii) purging both (i) and (ii) above to remove oxygen (e.g. using an inert gas);
(iv) mixing (i) and (ii) resulting from step (iii) to allow polymerization; and
(v) isolating said NCC-based supramolecular material.

Figure 1:
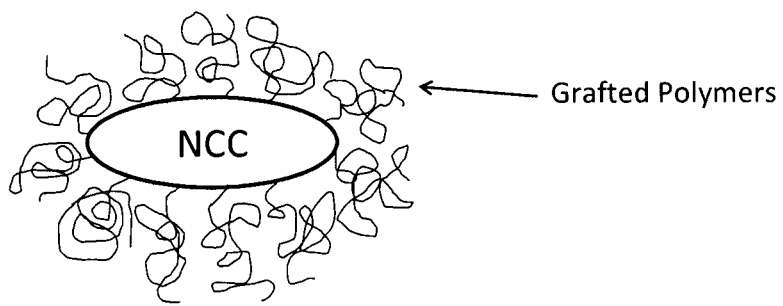
FIG. 1 is a schematic representation of the NCC-based supramolecular material.

The Applicant has developed an innovative method of preparing NCC-based supramolecular materials using in situ radical co-polymerization by selectively surface grafting a wide range of hydrophobic polymerizable monomers onto the NCC surface. The reaction can be conducted in an aqueous medium or a suitable organic solvent, in batch or continuous mode. FIG. 1 is schematically illustrating such material.

The resulting supramolecular materials are characterized by their nano-scale size and unique combination of low polarity and high hydrophobicity, which can be selectively engineered to meet specific applications and end-use requirements. As such, they function as copolymers for demanding polymeric systems characterized by very high hydrophobicity and low polarity, such as, but not limited to, polyolefins and polyesters. For example, the materials can be compounded with a multitude of polymeric systems using conventional polymer processing techniques to produce polymer nanocomposite having modified functionality and mechanical performance. As such, these supramolecular materials can find use in composite development for packaging materials, structural composites for automotive and construction, as well as sandwiched foam composites for industrial and structural applications. If combined with biocompatible polymers, NCC-based supramolecular materials can also be suitable for medical applications, including tissue scaffolding, prosthesis, drug delivery and release, as well as periodontal applications.

NCC is extracted as a colloidal suspension by acid hydrolysis of cellulosic materials, such as bacterial cellulose, tunicate, cotton, or wood pulp. NCC from any source can be used for preparing the supramolecular materials described here. NCC is constituted of cellulose, a linear polymer of $\beta(1\rightarrow4)$ linked D-glucose units, the chains of which arrange themselves to form crystalline and amorphous domains. Colloidal suspensions of cellulose crystallites form chiral nematic structure upon reaching a critical concentration. Hydrogen bonding between cellulose chains can stabilize the local structure in NCC, and plays a key role in the formation of crystalline domains. The iridescence of NCC self-assemblies is typically characterized by the fingerprint patterns, where the patch work of bright and dark regions is typical of spherulitic behaviour of fibrillar crystals in which the molecules are packed with their axes perpendicular to the fibrillar axis. NCC is also characterized by high crystallinity (between 85 and 97%, typically greater than 90%) approaching the theoretical limit of the cellulose chains.

A large variety of monomers can be used to synthesize NCC-based supramolecular materials. Four factors have to be simultaneously considered for the correct choice of monomer to be used: hydrophobicity and polarity of the monomer, or monomers in case of co-polymerization reaction, as well as melting and softening temperatures of the corresponding polymers or copolymers. A combination for polarity and hydrophobicity is essentially decided upon based on the polymer matrix to be subsequently used for composite manufacture. For example, the polarity of the monomer should be low and the hydrophobicity high in order to be compatible with polyolefins and polyesters. Further, if the reaction is to be carried out in a solvent, e.g., DMSO, then the monomer needs to be soluble in this solvent.

The monomers for use in the present disclosure are not particularly limited and can be methacrylates or acrylates. Lipophilic monomers (e.g. with long aliphatic chains) can be suitable in organic solvents and/or two monomer system aqueous polymerizations. The aliphatic chains of methacrylate or acrylate esters may be containing 8 or more carbon atoms; or 8 to 20 carbon atoms. In the case of a two-monomer system aqueous polymerization, a first monomer should be relatively soluble in water, while the second monomer can be insoluble or relatively insoluble in the medium. Non-limiting examples of generally suitable range of solubility in water is from at least about 1 g/100 ml; or at least about 1.5 g/100 ml; or from about 1.5 to about 6 g/100 ml; or preferably from about 1.5 to about 3 g/100 ml. Non-limiting examples of (meth)acrylate monomers include octyl methacrylate, lauryl methacrylate, dodecyl acrylate, butyl methacrylate, ethylhexyl acrylate, hexadecyl acrylate, hexadecyl methacrylate, hexyl acrylate, hexyl methacrylate, isobutyl methacrylate, isobutyl acrylate, isopropyl acrylate, isopropyl methacrylate, stearyl methacrylate, methyl acrylate, ethyl acrylate, butyl acrylate.

The corresponding polymer of the chosen monomer for the graft polymerization reaction cannot have a melting point or softening point higher than that of the polymer system with which a composite will be ultimately manufactured, otherwise subsequent composite processing can be problematic.

The degree of grafting of hydrophobic polymers onto NCC surface can be controlled by different reaction conditions and monomer-to-NCC ratios.

The radical polymerization requires a suitable initiator. Non-limiting examples of generally suitable initiators include persulfates, peroxides, transition metal ions, photo initiators, or other common free radical initiators.

The synthesized NCC-based supramolecular material can essentially be used as a copolymer to be compounded in polymer systems—possessing melting temperatures at or below the degradation temperature of the supramolecular material—to produce functional or structural composite materials. It is also possible to use the supramolecular material as-is. The polymers are also preferably processible, for example melt-processible and should be the same as, or compatible with, the polymer or co-polymer grafted on NCC. Some possible examples of hydrophobic polymers to be used for composite manufacture can be: polyolefins, polyesters, acrylate polymers, methacrylate polymers, polystyrenes, poly(vinyl ether)s. The amount of NCC material, when compounded in polymer, is not particularly limited, however for most applications a substantially small amount is required. For example, the amount of NCC material in the composite can be up to about 10% w/w; or up to about 5% w/w; or from about 0.5% to about 10% w/w; or from about 1% to about 5% w/w; or alternatively about 1.5% w/w.

The grafted-NCC material or nanocomposite containing same, as prepared herein, can be used to prepare articles comprising processible polymer(s) and/or co-polymer(s). Examples of such articles include without limitation films, sheets and extruded or molded articles.

The following examples are provided to further illustrate details for the preparation and use of the NCC-based supramolecular materials as well as nanocomposites containing same. They are not intended to be limitations on the scope of the instant disclosure in any way, and they should not be so construed. Those skilled in the art will readily understand that known variations of the conditions and processes of the following preparative procedures can be used to prepare these NCC-based supramolecular materials and nanocomposites.

Unless otherwise specified, the chemicals are purchased from Sigma-Aldrich except NCC, which is prepared in-house. NCC can practically be extracted from any biomass, as stated above. In this case we used kraft bleached pulp. Typically, the inhibitors in the monomer can be removed using an inhibitor-removal column prior to the reaction. This may be desirable, however, not critical, since the amount of inhibitors compared to the initiators used is typically negligible. All other chemicals are used as received.

General Process for In Situ Surface Graft Co-Polymerization of NCC in an Aqueous Medium.

In one approach, NCC-based supramolecular materials can be synthesized by in situ surface graft co-polymerization of NCC in an aqueous medium using two or more suitable monomers. For co-polymerization reactions, the choice of monomers is determined by the monomer's relative solubility in water. For example, in the case of a two-monomer system, a first monomer can be relatively soluble in water, while the second monomer can be insoluble or relatively insoluble in the medium.

The process begins by providing a water suspension of NCC and the monomers. in the desired ratios, and then diluted with deionized water (DI) to achieve the required concentration. The mass ratio of NCC to that of the monomers can be adjusted, ranging from about 1:10 to about 10:1. The mass ratio of the two monomers can also be adjusted, and the range can be from about 1:1 to about 1:7. In the final reaction suspension, the concentration of NCC is controlled to be from about 0.5% to about 5%. The pH of the reaction solution is adjusted to be acidic, from pH of about 1 to about 6, by using a mineral acid.

The reaction is initiated using a suitable free radical initiator. The required amount of initiator is dissolved in DI water with the desired amount of mineral acid. Both initiator and NCC solutions are then purged (e.g. with nitrogen) for a suitable duration. The polymerization starts by adding the initiator solution into the NCC solution, where the initiator is added in two steps. First, half of the initiator is added at once. Then, after a suitable time, the other half of the initiator is either added at once or titrated into the NCC solution slowly in a suitable time. The reaction is allowed to proceed for 1 to 6 hours at a suitably controlled temperature, from room temperature (about 21° C.) to 90° C. After completion of the reaction, the solid material is centrifuged down. The ungrafted polymers are extracted by either Soxhlet extraction or filtration with a suitable solvent. In the case of Soxhlet extraction, the extraction may proceed for at least 3 days. After the extraction is completed, the NCC-based supramolecular material is dried under suitable conditions. The material can be characterized using any standard method, for example FT-IR spectrum, Zeta measurements or electrophoretic mobility measurements.

General Process for In Situ Surface Graft Co-Polymerization of NCC in a Suitable Organic Solvent.

In another experimental procedure, the NCC suspension resulting from the acid hydrolysis of bleached kraft pulp (or other source of biomass) is neutralized to pH=7 by titrating against NaOH. The resultant form of NCC is termed Na-NCC, and is subsequently dried using freeze- or spray-drying. Freeze- or spray-dried Na-form NCC can be directly dispersed in an organic solvent with the desired amount of one or more water-insoluble monomer(s) possessing a suitable aliphatic chain. Alternatively, NCC in water suspension can be solvent-exchanged with an organic solvent, and the desired amount of water-insoluble monomer subsequently dissolved.

To broaden the list of possible solvents to be used to non-polar (e.g., toluene, chloroform) and polar aprotic (e.g., acetone, methyl ethyl ketone, tetrahydrofuran), as well as polar protic (e.g., water, methanol, ethanol, acetic acid) solvent, NCC can further be modified using, for instance, cationic or amphoteric surfactants, via ionic exchange. Typically, ionic exchange reactions are carried out in water with either sodium-form NCC (Na-NCC) or protonated NCC (H-NCC), whereby the required amount of surfactant is added to the NCC aqueous suspension to initiate the reaction. For this type of reaction, the temperature is typically maintained between 25 and 95° C., and ideally at 80° C. for approximately 1 hour, and up to 24 hours. After completion of the ionic exchange reaction, the surface-modified NCC is centrifuged or filtered with acetone to remove any unreacted chemicals.

Examples of commonly known cationic surfactants include quaternary ammonium surfactants such as cetyl trimethylammonium bromide (CTAB), cetyl trimethylammonium chloride (CTAC), Cetylpyridinium chloride (CPC), Benzalkonium chloride (BAC), Benzethonium chloride (BZT), Dimethyldioctadecylammonium chloride and Dioctadecyldimethylammonium bromide (DODAB).

The required amount of a suitable (thermal or photo) free radical initiator, is dissolved in the organic solvent as well. Both the NCC suspension and the initiator solution are purged (e.g. with nitrogen) for a suitable duration. Then, the initiator solution is introduced into the NCC suspension all at once to start the polymerization reaction. Alternatively, the initiator (such as a photo-initiator) can be added directly to the mixture of surfactant-modified NCC and the monomer(s) (i.e. without preparing an initiator solution followed by purging of same). The reaction proceeds at typically 50° C. for approximately about 10 to about 72 hours. As for the grafting in an aqueous medium, the reaction time and temperature, mass ratios of NCC to monomer(s) can suitably be adjusted. NCC concentration is maintained from about 0.5% to about 5%. The molar ratio of the initiator can suitably be adjusted. The resulting grafting yield can be determined gravimetrically from the mass of dried final product to that of NCC.

Following completion of the reaction, the NCC-based supramolecular material is precipitated and the ungrafted polymer is extracted using, for example, Soxhlet extraction or filtration, or other suitable purification technique for industrial applications. The material can be characterized using any standard method, for example FT-IR spectrum, Zeta measurements or electrophoretic mobility measurements.

Example 1: In Situ Surface Graft Co-Polymerization of NCC with Methyl Methacrylate (MMA) and Ethylhexyl Methacrylate (EHMA) in Water The reaction began by mixing a water suspension of Na-NCC with MMA and EHMA, and then diluted with deionized water (DI) to achieve the required concentration. The mass ratio of NCC to that of the monomers was 1:2 in this particular Example. The mass ratio of the two monomers was 1:3 in this case. In the final reaction solution, the concentration of NCC was controlled to be 3% w/w. The pH of the reaction solution was adjusted to pH 2 using $HNO_3$.

The reaction was initiated using 5% w of cerium ammonium nitrate (CAN) based on NCC. The initiator was dissolved in DI water with the required amount of $HNO_3$. The concentration of $HNO_3$ in the final reaction solution was controlled to be 0.01M. Both CAN and NCC solutions were then purged with nitrogen for 30 mins. The polymerization starts by adding the CAN solution into the Na-NCC suspension, where CAN was added in two steps. First, half of the initiator was added at once. Then, after 30 mins, the other half of the initiator was either added at once or titrated into the NCC solution slowly in 20 mins. The reaction was allowed to proceed for 1 to 6 hours at 65° C. After completion of the reaction, the solid material was centrifuged down at 4,400 rpm for 30 mins. The ungrafted polymers were extracted by either Soxhlet extraction or filtration with acetone. In the case of Soxhlet extraction, the extraction may proceed for at least 3 days. After the extraction was completed, the NCC-based supramolecular material is dried under vacuum, at 60° C. overnight.

Figure 2:
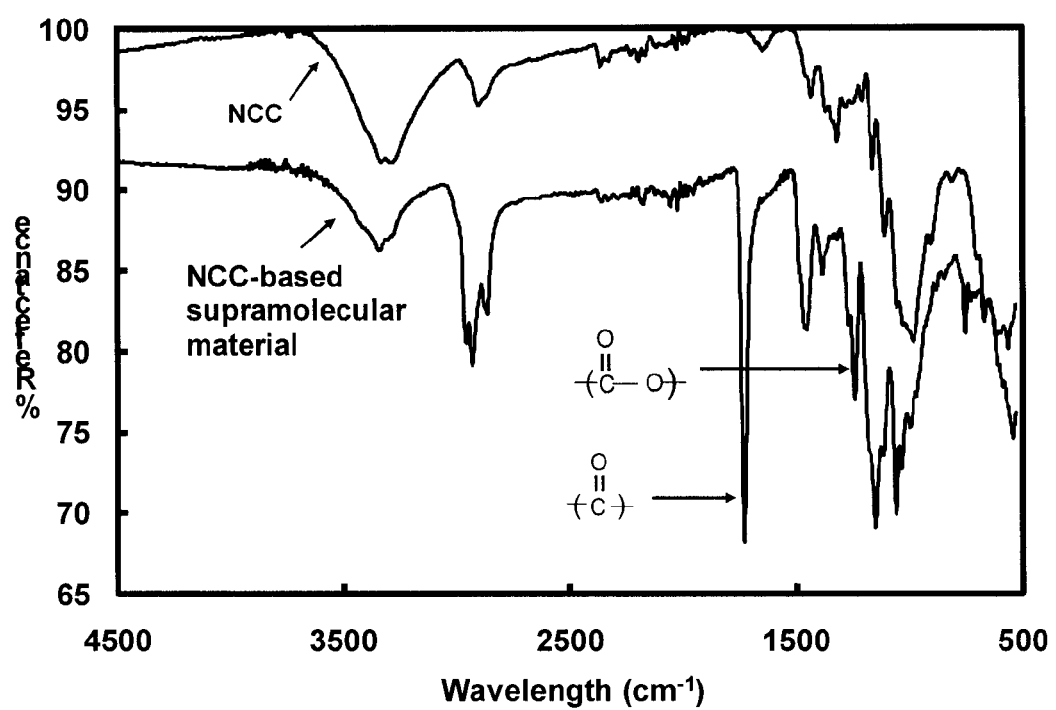
FIG. 2 is a FT-IR spectrum of NCC-based supramolecular material prepared according to Example 1 relative to pure NCC.

FIG. 2 shows the FT-IR spectrum of the obtained material relative to pure NCC performed using a Nicolet 6700 system (Thermo Electron Corporation), and all experiments were performed in the Smart Orbit mode, using diamond window. 32 scans were collected. The figure confirmed the successful grafting of the vinyl monomers onto NCC surface as indicated by two particular peaks, 1734 $cm^{-1}$, which represents the C=O vibrational mode, and 1241 $cm^{-1}$, corresponding to the C—O vibrational mode in the ester group.

Example 2: In Situ Surface Graft Polymerization of NCC with Ethylhexyl Methacrylate (EHMA) in an Organic Solvent Using a Chemical Initiator Na-NCC was dispersed in the organic solvent DMSO (in accordance with the techniques mentioned above) with the desired amount of ethylhexyl methacrylate (EHMA). The required amount of potassium persulfate (KPS) was dissolved in DMSO as well. Both the Na-NCC suspension and the KPS solution were purged with nitrogen for approximately 30 mins. Then, the KPS solution was introduced into the Na-NCC suspension all at once to start the polymerization reaction. The reaction was allowed to proceed at about 50° C. for about 24 hours. As in Example 1, the reaction time and temperature, mass ratios of Na-NCC to monomer was suitably adjusted. Na-NCC concentration was maintained at 2% and the EHMA-to-NCC ratio adjusted at 4 to 1. The molar ratio of KPS to monomer is controlled at 1 to 100. The resulting grafting yield, determined gravimetrically from the mass of dried final product to that of Na-NCC, is 408%.

Figure 3:
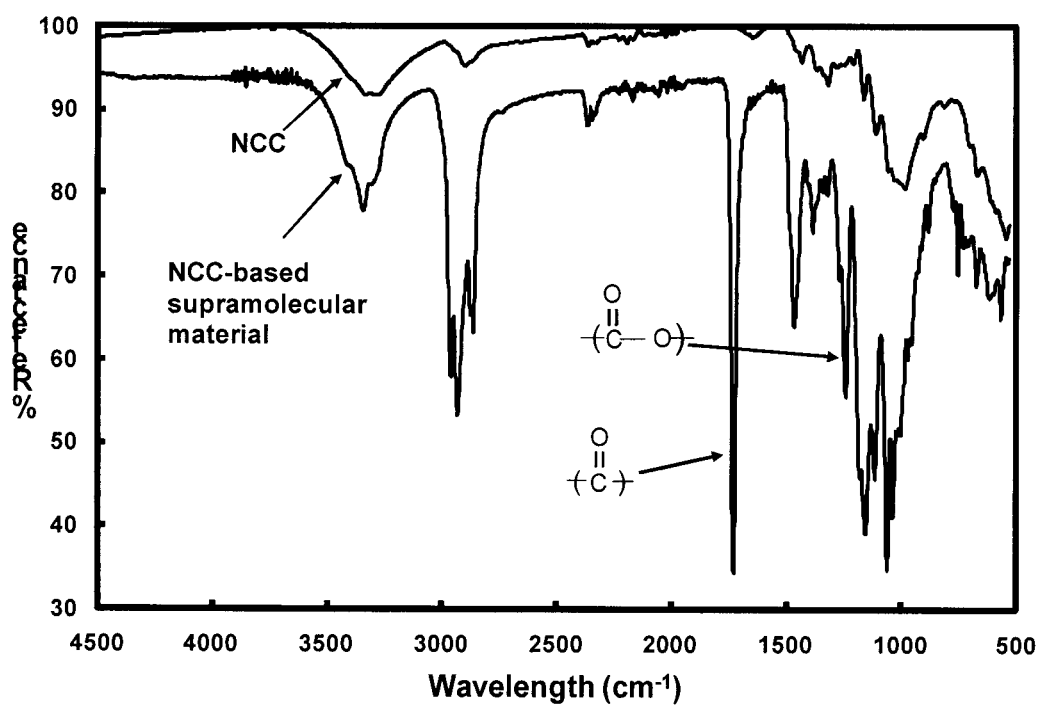
FIG. 3 is a FT-IR spectrum of NCC-P(EHMA) supramolecular material prepared in accordance with Example 2 relative to pure NCC.

FIG. 3 shows the FT-IR spectrum of the obtained material relative to pure Na-NCC performed in accordance with the conditions described in Example 1. The figure confirmed the successful synthesis of NCC-P(EHMA) supramolecular material with peaks at 1734 $cm^{-1}$, representing the C=O vibrational mode, and 1241 $cm^{-1}$, corresponding to the C—O vibrational mode in the ester group.

Following completion of the reaction, the NCC-based supramolecular material was precipitated using centrifugation with methanol. The ungrafted polymer was extracted with acetone using, for example, Soxhlet extraction or filtration. The typical size of NCC-P(EHMA) supramolecular materials, as determined by Zeta measurements of samples in DMSO, is 63.8±1.9 nm as compared to Na-NCC particle size of 40.2±0.5 nm, using similar measurements. The electrophoretic mobility measurements associated with these samples are −0.262±0.254 and −1.126±0.04, for the supramolecular material and pure Na-NCC, respectively. The surface charge and hydrodynamic diameter of NCC-based supramolecular materials were determined using a Malvern Instrument Zetasizer 3000 HS. Samples were prepared in DMSO, where 3 runs with 10 measurements each were conducted for the diameter and 10 runs for the zeta potential. These results indicate further experimental evidence for the successful synthesis of NCC-based supramolecular materials—larger size, but still within the nano range, and lower surface charge.

Example 3: In Situ Surface Graft Polymerization of Ionically-Modified NCC with Ethylhexyl Methacrylate (EHMA) in an Organic Solvent Using a Thermal Free-Radical Initiator Ionic modification of the surface of NCC can be carried out using, but not limited to, cetrimonium bromide (CTAB). First, the required amount of CTAB and Na-NCC was separately dissolved in deionized (DI) water. The NCC aqueous suspension was heated to 80° C. in oil bath, and the CTAB solution was then poured into the NCC suspension with fast stirring. The reaction proceeded for 2 hours at 80° C. After the reaction, acetone was added to the suspension to get 50/50 acetone/water mixture, which was mixed for 1 minute with a disintegrator. The resulting suspension was centrifuged at 4000 rpm for 30 minutes, and the paste was washed with acetone twice by centrifugation. The reaction time and temperature, mass ratios of Na-NCC to monomer can suitably be adjusted. The mass ratio of CTAB to NCC can be from 0.2:1 to 5:1, for instance in our example 1.22:1. The temperature range can be from 25° C. to 95° C. and the reaction time can be from 1 to 24 hours.

Figure 4:
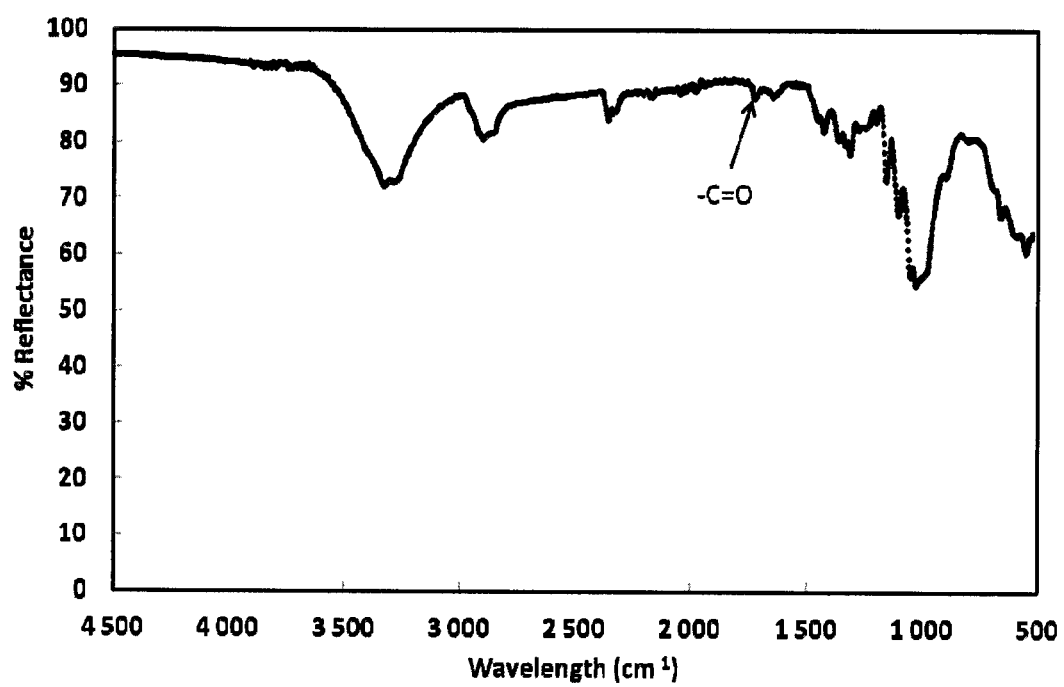
FIG. 4 is a FT-IR spectrum of NCC-P(EHMA) supramolecular material prepared in accordance with Example 3.

CTAB-modified NCC was then dispersed in a suitable organic solvent, for instance, methyl ethyl ketone (MEK) by disintegration with the desired amount of ethylhexyl methacrylate (EHMA). A thermal free-radical initiator can be used in this case. The required amount of initiator, Azobisisobutyronitrile (AIBN), was dissolved in MEK, separately. Both the CTAB-NCC suspension and the AIBN solution were purged with nitrogen for approximately 30 min. Then, the AIBN solution was introduced into the CTAB-NCC suspension all at once to start the polymerization reaction. The reaction was allowed to proceed at about 60° C. for approximately 24 hours. The reaction time and temperature, mass ratios of Na-NCC to monomer were suitably adjusted, whereas CTAB-NCC concentration was maintained at 2% and EHMA-to-NCC ratio was adjusted to 4 to 1. The molar ratio of AIBN to monomer was controlled at 1 to 100. Following completion of the reaction, the NCC-based supramolecular material was centrifuged out, and the ungrafted polymer was extracted using centrifugation three times with MEK until nothing could be precipitated in the supernatant with methanol. FIG. 4 depicts the FT-IR spectrum of the NCC-P(EHMA) supramolecular material prepared using the preparation in this example.

Figure 5:
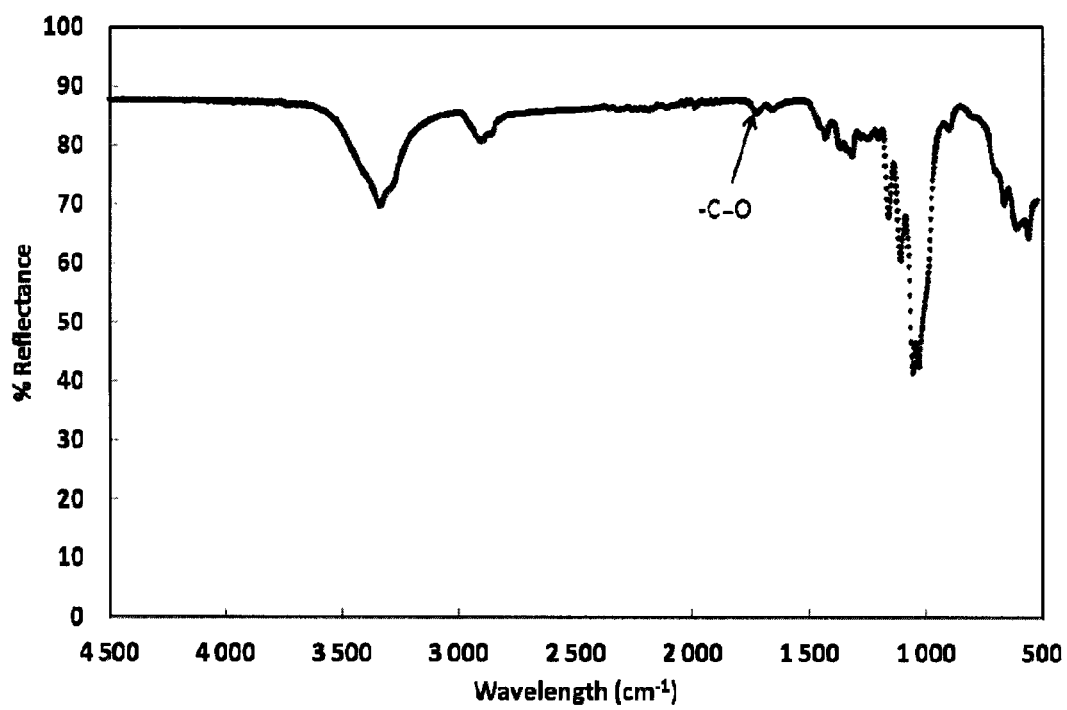
FIG. 5 is a FT-IR spectrum of NCC-P(EHMA) supramolecular material prepared in accordance with Example 4.

Example 4: In Situ Surface Graft Polymerization of Ionically-Modified NCC with Ethylhexyl Methacrylate (EHMA) Using a Photo-Initiator In another experimental process, photo free radical initiator was used. CTAB-NCC was dispersed in a suitable organic solvent, for example, MEK, by disintegration with the desired amount of ethylhexyl methacrylate (EHMA). The CTAB-NCC suspension was purged with nitrogen for approximately 30 min. The required amount of, photo-initiator, 1-Hydroxycyclohexyl phenyl ketone (Irgacure 184) was directly dissolved in the CTAB-NCC suspension. The polymerization reaction was initiated by using a UV lamp (wavelength=365 nm), and the reaction was allowed to proceed at ~21° C. for approximately 24 hours. The reaction time and temperature, mass ratios of CTAB-NCC to monomer was suitably adjusted, whereas CTAB-NCC concentration was maintained at 2% and the EHMA-to-NCC ratio was adjusted to 4 to 1. The molar ratio of the photo-initiator, Irgacure 184, to monomer is controlled at 2 to 100. FIG. 5 depicts the FT-IR spectrum of the NCC-P(EHMA) supramolecular material prepared using the preparation in this example.

Example 5: Polymer Composite Processing

NCC-based supramolecular materials can essentially act as excellent copolymers in the production of a wide range of polymer composite materials. For example, NCC-P(EHMA) supramolecular materials, prepared according to Example 2, can be compounded with commercial polyolefins, for instance, poly(propylene) (PP) or high-density poly(ethylene) (HDPE), using conventional polymer processing techniques.

In a particular example, a twin-screw extruder (Eurolab 16 from Thermal Scientific) was used to compound the dry material from Example 2 with either PP or HDPE pellets. Polymer pellets were purchased from Ashland. A typical temperature profile from die to feeder of the twin-extruding equipment can be: 180 210 210 210 200 190° C.

Figure 6:
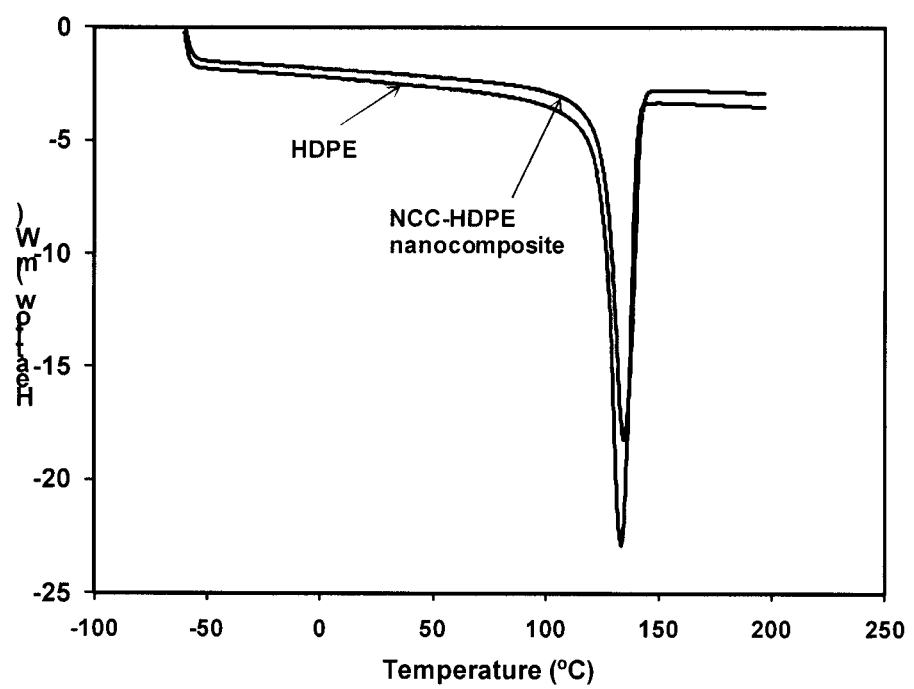
FIG. 6 is structural response as a function of temperature—experimentally determined using differential scanning calorimetry measurements—of polymer nanocomposite comprising HDPE and a small dosage of the NCC-based supramolecular material, in relation to neat HDPE.
Figure 7:
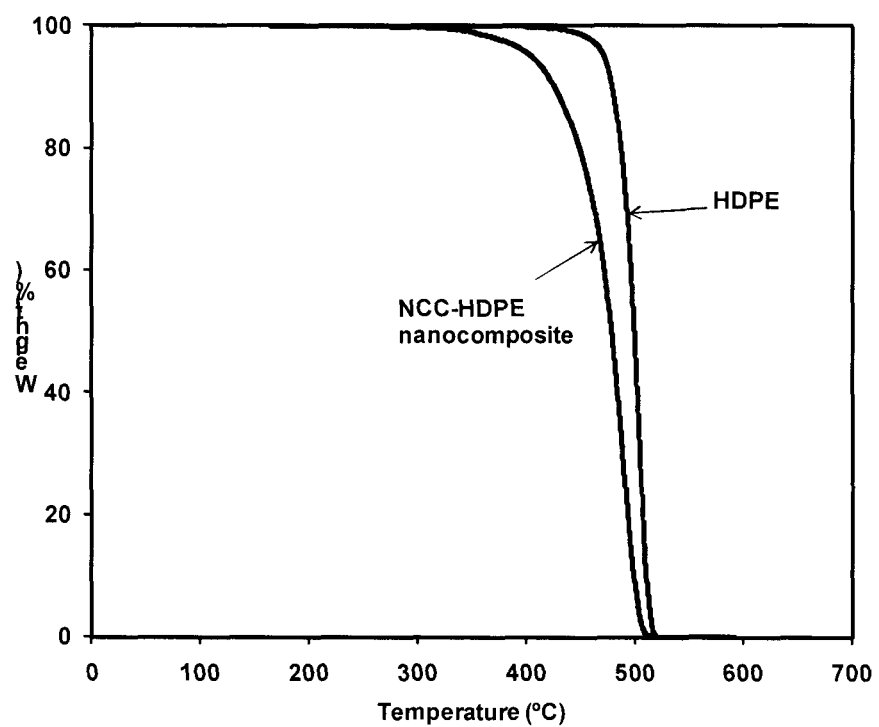
FIG. 7 is thermal stability—experimentally determined by thermogravimetrically measuring mass as a function of temperature—of polymer nanocomposites comprising HDPE and a small dosage of the NCC-based supramolecular material, in relation to neat HDPE.
Figure 8:
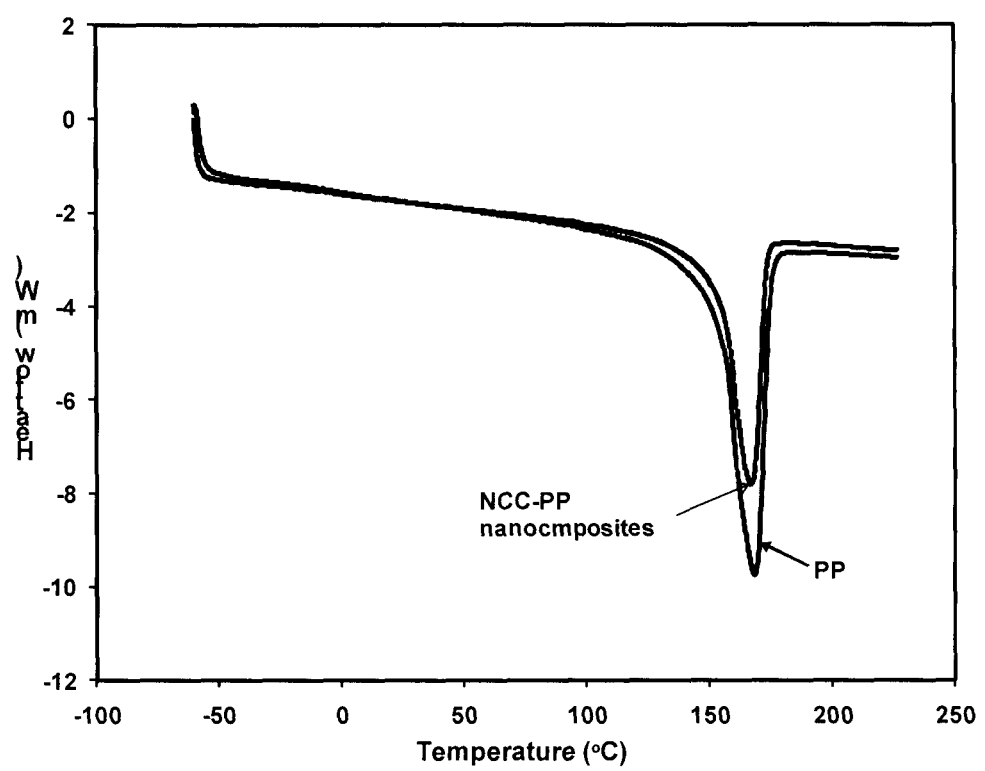
FIG. 8 is structural response as a function of temperature—experimentally determined using differential scanning calorimetry measurements—of polymer nanocomposite comprising PP and a small dosage of the NCC-based supramolecular material, in relation to neat PP.
Figure 9:
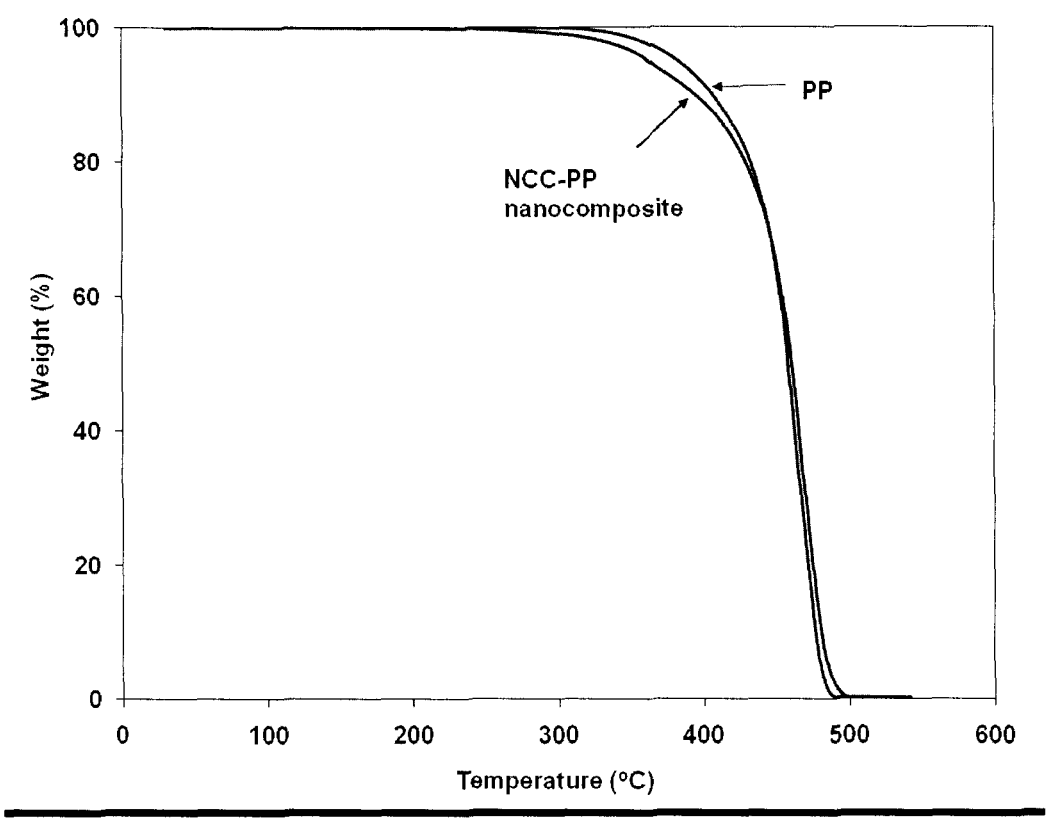
FIG. 9 is thermal stability—experimentally determined by thermogravimetrically measuring mass as a function of temperature—of polymer nanocomposites comprising PP and a small dosage of the NCC-based supramolecular material, in relation to neat PP.

FIG. 6 and FIG. 7 depict the structural and thermal stability of polymer composite materials compounded using 1.5% wt NCC-P(EHMA) supramolecular material and HDPE compared to neat HDPE. Both responses are practically identical for both materials, indicating that the supramolecular materials do not interfere with the thermal processing capabilities of HDPE. Similar results are presented in FIG. 8 and FIG. 9 using 2% wt NCC-P(EHMA) supramolecular material and PP. Thermogravimetric analysis was performed using a TGA Q50 (TA Instruments) under nitrogen atmosphere. The tests were carried out from 30° C. to 550° C. with a heating rate of 20° C./min. Differential scanning calorimetric measurements were carried out using DSC Q100 (TA Instruments) with a liquid nitrogen cooling system. Samples were tested from −50° C. to 230° C. at 10° C./min under nitrogen. The samples were allowed to undergo the same thermal history and the second cycle of the measurements was used for data analysis.

The significant improvement with inclusion of the supramolecular material is their ability to enhance the functionality and toughness, or energy absorption capacity, of the resulting nanocomposite. In these nanocomposites, it is believed that the NCC disperses very well within the polyolefin polymer matrix, since the two components are highly compatible. Furthermore, the interface between the NCC reinforcement and the polyolefin matrix is significantly enhanced resulting in more than 150% increase (as indicated by tensile testing of prepared samples) in total energy absorption capacity of the nanocomposite material. The uniformity of dispersion of the NCC nano particles and the excellent interface with the matrix are also responsible for improving the gas barrier properties of the polyolefins. It is believed that this results from the fact that the NCC contributes to improving both the crystallinity of the polyolefin as well as the interfacial properties within the nanocomposite, thereby enhancing the capability of the resulting nanocomposite material to develop enhanced resistance to gas permeability.

For example, an HDPE nanocomposite film containing approximately 1.5% NCC-based supramolecular material (prepared according to Example 2) has oxygen transmission rate (OTR) averaging 63.5±3.17 cc/m$^2$·day. OTR is a measure of the rate of oxygen permeability through the sample, and is performed at 23° C. Films are prepared by compression moulding the compounded pellets of NCC-P(EHMA) supramolecular material and commercial HDPE under 1000 psi for 7 minutes at 170° C. using a Carver system. This is relative to known OTR values for HDPE films (of similar thickness) in excess of 1000 cc/m$^2$·day.

These functional improvements are made possible at fairly low NCC dosage, typically <5% w/w (1.5% w/w is used in this specific example) since a well-dispersed, likely percolated, network of NCC particles forms within the matrix and allows for efficient stress transfer.

Example 6: Thermal Stability of NCC-P(EHMA) Supramolecular Material

Thermogravimetric analysis, carried out from 30° C. to 550° C. at a heating rate of 20° C.·min$^{-1}$. using a TGA Q50

Figure 10:
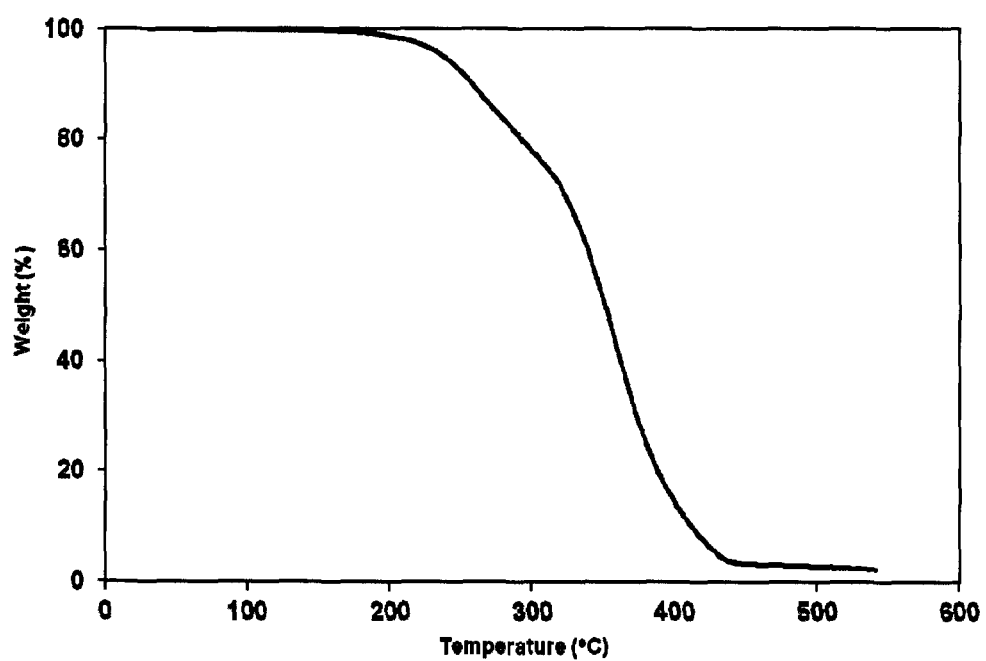
FIG. 10 is thermal stability—experimentally determined by thermogravimetrically measuring mass as a function of temperature—of NCC-P(EHMA) supramolecular material prepared in accordance with Example 2.
Figure 11:
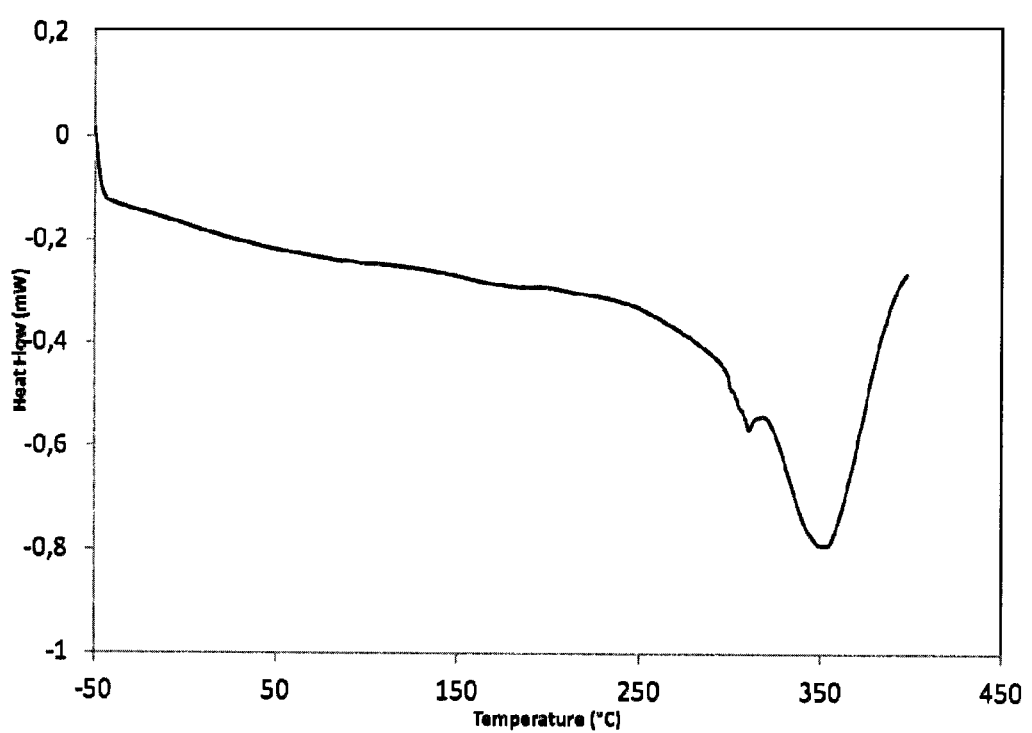
FIG. 11 is structural response as a function of temperature—experimentally determined using differential scanning calorimetry measurements—of NCC-P(EHMA) supramolecular material prepared in accordance with Example 2.

(TA Instruments) under nitrogen atmosphere, indicates that the 5% weight loss point of the NCC-P(EHMA) supramolecular material is calculated to be approximately 240° C. (FIG. 10). Differential scanning calorimetry, carried out using a DSC Q100 (TA Instruments) under nitrogen where the sample is heated from −50° C. to 400° C. at a rate of 10° C.·min$^{-1}$, confirms that the NCC-P(EHMA) material is thermally stable when heated up to 250° C. (FIG. 11).

Figure 12:
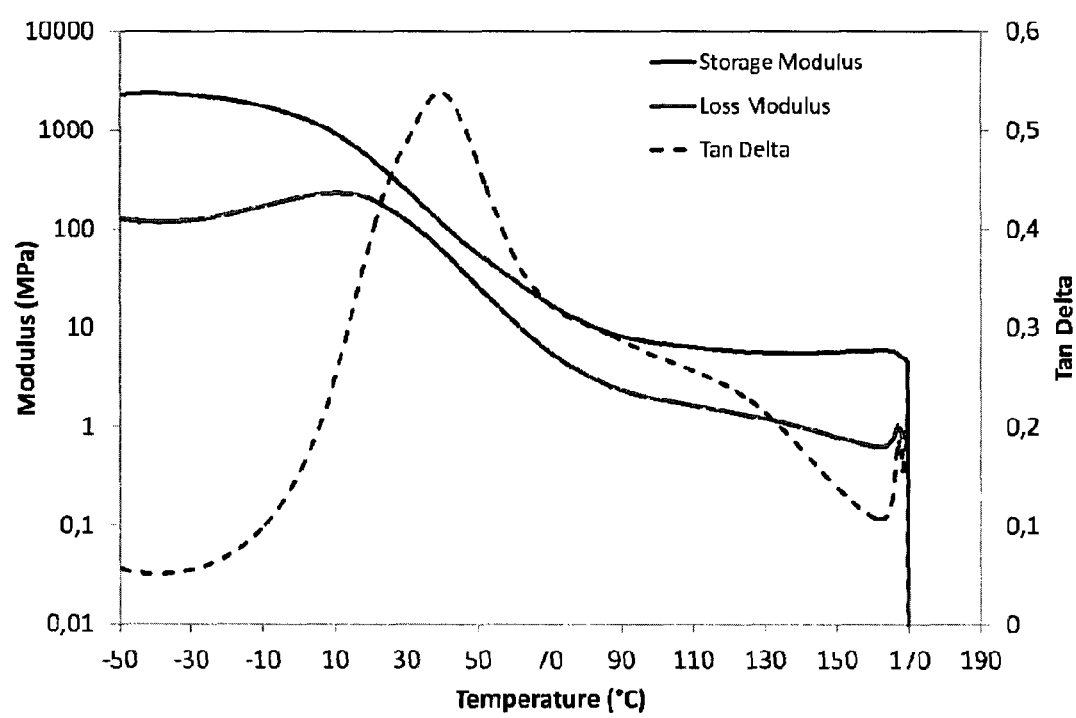
FIG. 12 is dynamic mechanical response—modulus response as a function of temperature experimentally determined by Dynamic Mechanical Analysis—of NCC-P (EHMA) supramolecular material prepared in accordance with Example 2. Solid line represents the storage modulus, double solid line represents loss modulus, and dashed line represents Tan Delta, which is the phase angle or the ratio of loss to storage moduli.

Dynamic Mechanical Analysis, carried out in tensile mode using a DMA Q800 (TA Instruments) at a constant frequency of 1 Hz, strain amplitude of 20.0 µm, temperature range between −50° C. and 200° C., and heating rate of 3° C.·min$^{-1}$, indicate that the NCC-P(EHMA) supramolecular material yields at about 170° C. It can be calculated from the Tan Delta curve (FIG. 12) that the glass transition temperature, $T_g$, of the NCC-P(EHMA) supramolecular material is 39.4° C. This is a substantial increase compared to $T_g$ of neat poly(EHMA), which is about −10° C. This significantly improved glass transition temperature renders the NCC-P (EHMA) supramolecular material a more rigid thermoplastic material suited for a multitude of commercial polymer processing techniques, as well as synthesis of composite materials.

While the disclosure has been described in connection with specific embodiments thereof, it is understood that it is capable of further modifications and that this application is intended to cover any variation, use, or adaptation of the disclosure following, in general, the principles of the disclosure and including such departures from the present disclosure that come within known, or customary practice within the art to which the disclosure pertains and as may be applied to the essential features hereinbefore set forth, and as follows in the scope of the appended claims

The invention claimed is:

1. A process for preparing NCC-based supramolecular material comprising:
   (i) providing a mixture comprising Na-NCC or a surfactant-modified-NCC and one or more water-insoluble monomer(s) in an organic solvent, said mixture being suitable for free radical polymerization, and wherein said one or more water-insoluble monomer(s) comprises a methacrylate or acrylate monomer;
   (ii) providing a solution of a free radical initiator in an organic solvent;
   (iii) purging oxygen from the mixture of (i) and the solution of (ii);
   (iv) mixing (i) and (ii) after step (iii) and polymerizing said water-insoluble monomer(s) in said organic solvent; and
   (v) isolating said NCC-based supramolecular material.

2. The process of claim 1, wherein said mixture in step (i) is a mixture of Na-NCC and one or more water-insoluble monomer(s) in an organic solvent.

3. The process of claim 1, wherein said mixture in step (i) is a mixture of a surfactant-modified-NCC and one or more water-insoluble monomer(s) in an organic solvent.

4. The process of claim 1, wherein said one or more water-insoluble monomer is a lipophilic aliphatic chains-containing methacrylate or acrylate ester.

5. The process of claim 4, wherein said aliphatic chain-containing methacrylate or acrylate ester is comprising 8 or more carbon atoms in said aliphatic chain.

6. The process of claim 3, wherein the surfactant of said surfactant-modified-NCC is a cationic surfactant.

7. The process of claim 6, wherein said cationic surfactant is a quaternary ammonium surfactant.

8. The process of claim 4, wherein said aliphatic chain-containing methacrylate or acrylate esters is comprising 8 to 20 carbon atoms.

9. The process of claim 1, wherein said one or more water-insoluble monomer(s) comprises octyl methacrylate, lauryl methacrylate, dodecyl acrylate, hexadecyl acrylate, hexadecyl methacrylate, stearyl methacrylate or a mixture thereof.

10. The process of claim 7, wherein said quaternary ammonium surfactant is cetyl trimethylammonium bromide (CTAB), cetyl trimethylammonium chloride (CTAC), Cetylpyridinium chloride (CPC), Benzalkonium chloride (BAC), Benzethonium chloride (BZT), Dimethyldioctadecylammonium chloride or Dioctadecyldimethylammonium bromide (DODAB).

* * * * *